US011941621B2

(12) United States Patent
Edwards et al.

(10) Patent No.: US 11,941,621 B2
(45) Date of Patent: Mar. 26, 2024

(54) SECURE AUTHENTICATION BASED ON PASSPORT DATA STORED IN A CONTACTLESS CARD

(71) Applicant: Capital One Services, LLC, McLean, VA (US)

(72) Inventors: Samuel Edwards, Richmond, VA (US); Jason Pribble, McLean, VA (US); Nicholas Capurso, Tysons Corner, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/106,661

(22) Filed: Feb. 7, 2023

(65) Prior Publication Data

US 2023/0186297 A1 Jun. 15, 2023

Related U.S. Application Data

(63) Continuation of application No. 16/725,547, filed on Dec. 23, 2019, now Pat. No. 11,651,361.

(51) Int. Cl.
*G06Q 20/38* (2012.01)
*G06Q 20/40* (2012.01)
(52) U.S. Cl.
CPC ..... *G06Q 20/3829* (2013.01); *G06Q 20/4014* (2013.01)
(58) Field of Classification Search
CPC ................ G06Q 20/3829; G06Q 20/4014

USPC ........................................................ 705/71
See application file for complete search history.

(56) References Cited

U.S. PATENT DOCUMENTS

| 2019/0188705 | A1* | 6/2019 | Ecker | G06Q 20/40 |
| 2019/0251561 | A1* | 8/2019 | Oosthuizen | G07F 7/10 |
| 2020/0177584 | A1* | 6/2020 | Wajs | G06F 21/32 |
| 2021/0176242 | A1* | 6/2021 | McDougall | H04L 63/0861 |

FOREIGN PATENT DOCUMENTS

EP 3215977 A1 * 9/2017 ............. G06F 21/64

* cited by examiner

*Primary Examiner* — Courtney P Jones
(74) *Attorney, Agent, or Firm* — KDW FIRM PLLC

(57) ABSTRACT

Systems, methods, articles of manufacture, and computer-readable media for secure authentication based on passport data stored in a contactless card associated with an account. An application may receive an indication to perform an operation. The application may receive encrypted data from the card. The application may receive an indication that the authentication server verified the encrypted data based on a private key. The application may receive encrypted passport data from the contactless card, the encrypted passport data for a passport associated with the account. The application may determine an attribute of the passport based at least in part on image data or text input. The application may decrypt the encrypted passport data based on the attribute of the passport. The application may initiate performance of the operation based on the received indication specifying that the authentication server verified the encrypted data and the decryption of the encrypted passport data.

20 Claims, 11 Drawing Sheets

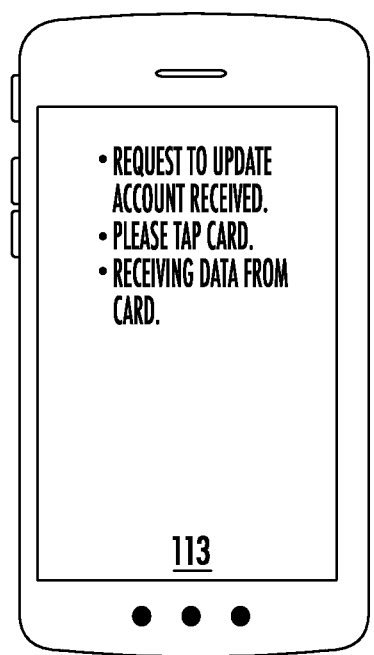
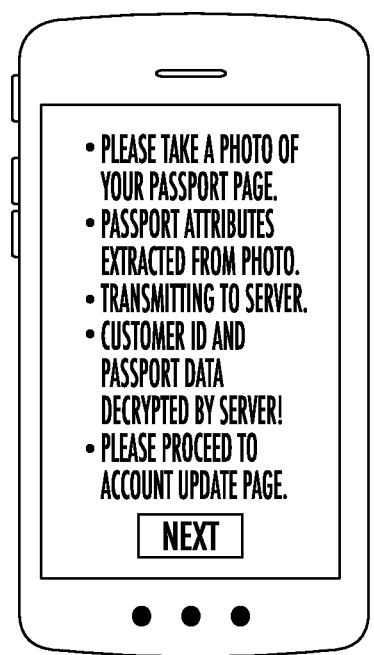
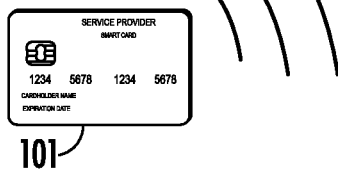
FIG. 3A
FIG. 3B

SECURE AUTHENTICATION BASED ON PASSPORT DATA STORED IN A CONTACTLESS CARD

CROSS-REFERENCE TO RELATED APPLICATIONS

This application claims priority to and is a continuation of U.S. patent application Ser. No. 16/725,547, entitled "SECURE AUTHENTICATION BASED ON PASSPORT DATA STORED IN A CONTACTLESS CARD" filed on Dec. 23, 2019. The contents of the aforementioned patent application are incorporated herein by reference in their entirety.

TECHNICAL FIELD

Embodiments herein generally relate to computing platforms, and more specifically, to using a contactless card storing passport data for secure authentication.

BACKGROUND

Identity verification is an important task for modern computing systems. Conventional approaches may require that users provide additional information, such as a one-time passcode (OTP), when attempting to access computing systems or perform electronic transactions. However, security vulnerabilities may exist in these solutions. For example, the OTP may be intercepted and used to gain unauthorized access. Furthermore, different systems may require different types of additional information for identity verification, making conventional solutions impractical for many users.

SUMMARY

Embodiments disclosed herein provide systems, methods, articles of manufacture, and computer-readable media for secure authentication based on identity data stored in a contactless card. In one example, an application may receive an indication specifying to perform an operation associated with an account. The application may receive encrypted data from a contactless card associated with the account, the encrypted data based on a cryptographic algorithm, a customer identifier, and a private key for the contactless card. The application may receive, from an authentication server, an indication specifying that the authentication server verified the encrypted data based on the private key for the contactless card. The application may receive encrypted passport data from the contactless card, the encrypted passport data for a passport associated with the account. The application may determine an attribute of the passport based at least in part on image data or text input. The application may decrypt the encrypted passport data based on the attribute of the passport. The application may initiate performance of the operation based on the received indication specifying that the authentication server verified the encrypted data and the decryption of the encrypted passport data.

BRIEF DESCRIPTION OF THE DRAWINGS

FIGS. 3A-3B illustrate embodiments of tapping a contactless card to a computing device to provide secure authentication based on passport data stored in the contactless card.

DETAILED DESCRIPTION

Figure 1A:
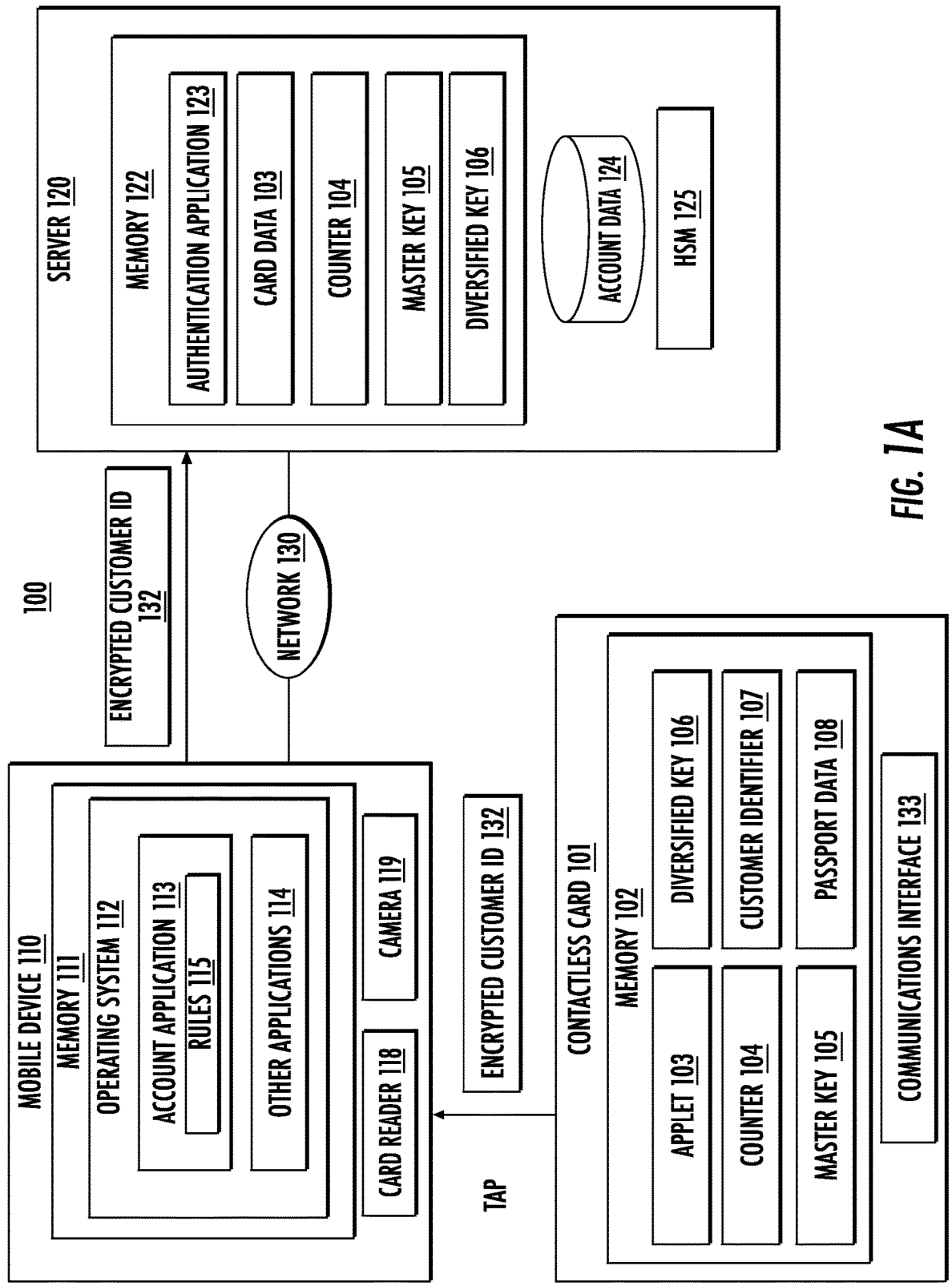
FIGS. 1A-1B illustrate embodiments of a system for secure authentication based on passport data stored in a contactless card.

Embodiments disclosed herein provide techniques for secure authentication using passport data stored in a contactless card. Generally, a contactless card may store a plurality of different types of information for a user, such as payment information, passport information, and/or any other biographical information. The user may then attempt to perform an operation, such as making a purchase, transferring funds via an application executing on a mobile device, requesting a credit increase via the application, and the like. The application may determine a type of authentication data required to authorize the requested operation. For example, a rule may specify that transferring funds via the application requires authentication based on passport data stored in the contactless card. Therefore, the application may determine that passport data as the type of authentication data.

The user may then tap the contactless card to the mobile device to initiate the secure authentication process. Once tapped, the contactless card may generate and transmit encrypted data to the application. The encrypted data may be generated based on a cryptographic algorithm, a customer identifier, and an encryption key for the contactless card. The application may then transmit the encrypted data to an authentication server for authentication. The server may then decrypt the encrypted data using a local copy of the encryption key for the contactless card to yield the customer identifier, thereby authenticating the encrypted data. The server may then transmit an indication of the authentication of the encrypted data to the application.

The application may then attempt to decrypt the passport data. In some embodiments, the passport data is sent by the contactless card to the application with the encrypted customer identifier. In other embodiments, the passport data is separately sent by the contactless card subsequent to another tap of the contactless card to the mobile device. To decrypt the passport data, the application may receive one or more attributes of the passport. For example, an image depicting one or more pages of the passport may be captured, and the attributes may be extracted from the captured image. As another example, the user may provide the attributes as input. The application may then authorize the performance of the operation based on the received indication specifying that the authentication server verified the encrypted data and the decryption of the passport data. For example, the user may be permitted to access an interface of the application to transfer funds from one account to another.

Advantageously, embodiments disclosed herein improve the security of all devices and associated data. For example, by requiring validation of encrypted data generated by the contactless card to access applications and/or data, the security of the applications and/or data are improved. As another example, by requiring validation of the encrypted passport data prior to performing operations (e.g., making purchases, extending credit, etc.), the security of such operations and associated assets is improved.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose or a digital computer. Various embodiments also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed embodiments. As shown, the system 100 includes one or more contactless cards 101, one or more mobile computing devices 110, and an authentication server 120. The contactless cards 101 are representative of any type of payment cards, such as a credit card, debit card, ATM card, gift card, and the like. The contactless cards 101 may comprise one or more communications interfaces 133, such as a radio frequency identification (RFID) chip, configured to communicate with the computing devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The authentication server 120 is representative of any type of computing device, such as a server, workstation, compute cluster, cloud computing platform, virtualized computing system, and the like.

As shown, a memory 102 of the contactless card includes an applet 103, a counter 104, a master key 105, a diversified key 106, a unique customer identifier (ID) 107, and passport data 108. The applet 103 is executable code configured to perform the operations described herein. The counter 104, master key 105, diversified key 106, and customer ID 107 are used to provide security in the system 100 as described in greater detail below. The passport data 108 is representative of an electronic passport of a user associated with the contactless card 101. The passport data 108 may include any number and types of data. For example, the passport data 108 may include text data describing different attributes of the passport and/or user (e.g., name, date of birth, passport number, passport issue date, passport expiration date, issuing nation, etc.) as well as image data (e.g., one or more images of the passport itself, an image of the user included in the passport, etc.). In some embodiments, the passport data 108 is encrypted. For example, the passport data 108 may be encrypted based on one or more attributes of the passport. The one or more attributes may include a passport number, a passport issue date, and/or a passport expiration date.

As shown, a memory 111 of the mobile device 110 includes an instance of an operating system (OS) 112. Example operating systems 112 include the Android® OS, iOS®, macOS®, Linux®, and Windows® operating systems. As shown, the OS 112 includes an account application 113. The account application 113 allows users to perform various account-related operations, such as viewing account balances, purchasing items, processing payments, and the like. The account application 113 may further control access permissions to different functions provided by the account application 113 and/or the other applications 114. Generally, a user may authenticate using authentication credentials to access certain features of the account application 113. For example, the authentication credentials may include a username (or login) and password, biometric credentials (e.g., fingerprints, Face ID, etc.), and the like.

According to various embodiments, the user may request and/or attempt to perform an operation. The operation may include any type of operation, such as using the contactless card 101 to make a purchase, accessing certain features of the account application 113, performing various account-related operations using the account application 113, and/or accessing the other applications 114 (or any feature thereof). The other applications 114 are representative of any type of computing application, such as web browsers, messaging applications, word processing applications, social media applications, and the like. For example, the user may desire to transfer funds from their account to another account using the account application 113. The use of a specific operation as a reference example herein is not limiting of the disclosure, as the disclosure is equally applicable to any other type of operation.

To authorize the requested operation, (e.g., the previous example of transferring funds), the system 100 must authenticate and/or verify the identity of the user. To authenticate the identity of the user, embodiments disclosed herein may leverage the contactless card 101. More specifically, once the user requests to perform the operation (or otherwise access a restricted resource), the account application 113 may output a notification instructing the user to tap the contactless card 101 to the device 110. Generally, once the contactless card 101 is brought within communications range of the communications interface 118 of the device 110, the applet 103 of the contactless card 101 may generate encrypted data, e.g., an encrypted customer ID 132 as part of the authentication process required to authorize the requested operation. To enable NFC data transfer between the contactless card 101 and the mobile device 110, the account application 113 may communicate with the contactless card 101 when the contactless card 101 is sufficiently close to the communications interface 118 of the mobile device 110. The communications interface 118 may be configured to read from and/or communicate with the communications interface 133 of the contactless card 101 (e.g., via NFC, Bluetooth, RFID, etc.). Therefore, example communications interfaces 118 include NFC communication modules, Bluetooth communication modules, and/or RFID communication modules.

As stated, the system 100 is configured to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location, such as the hardware security module (HSM) 125). The master key may be kept secret from all parties other than the contactless card 101 and server 120, thereby enhancing security of the system 100. In some embodiments, the applet 103 of the contactless card 101 may encrypt and/or decrypt data (e.g., the customer ID 107 and/or passport data 108) using the master key 105 and the data as input a cryptographic algorithm. For example, encrypting the customer ID 107 with the master key 105 may result in the encrypted customer ID 132. Similarly, the authentication server 120 may encrypt and/or decrypt data associated with the contactless card 101 using the corresponding master key 105.

In other embodiments, the master keys 105 of the contactless card 101 and server 120 may be used in conjunction with the counters 104 to enhance security using key diversification. The counters 104 comprise values that are synchronized between the contactless card 101 and server 120. The counter value 104 may comprise a number that changes each time data is exchanged between the contactless card 101 and the server 120 (and/or the contactless card 101 and the mobile device 110). When preparing to send data (e.g., to the server 120 and/or the mobile device 110), the contactless card 101 may increment the counter value 104. The contactless card 101 may then provide the master key 105 and counter value 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. Examples of key diversification techniques are described in greater detail in U.S. patent application Ser. No. 16/205,119, filed Nov. 29, 2018. The aforementioned patent application is incorporated by reference herein in its entirety.

Continuing with the key diversification example, the contactless card 101 may then encrypt the data (e.g., the customer ID 107 and/or any other data, such as the passport data 108) using the diversified key 106 and the data as input to the cryptographic algorithm. For example, encrypting the customer ID 107 with the diversified key 106 may result in the encrypted customer ID 132.

Regardless of the encryption technique used, the contactless card 101 may then transmit the encrypted data (e.g., the encrypted customer ID 132) to the account application 113 of the mobile device 110 (e.g., via an NFC connection, Bluetooth connection, etc.). The account application 113 of the mobile device 110 may then transmit the encrypted customer ID 132 to the server 120 via the network 130. In at least one embodiment, the contactless card 101 transmits the counter value 104 with the encrypted data. In such embodiments, the contactless card 101 may transmit an encrypted counter value 104, or an unencrypted counter value 104.

Once received, the authentication application 123 may authenticate the encrypted customer ID 132. For example, the authentication application 123 may attempt to decrypt the encrypted customer ID 132 using a copy of the master key 105 stored in the memory 122 of the authentication server 120. In another example, the authentication application 123 may provide the master key 105 and counter value 104 as input to the cryptographic algorithm, which produces a diversified key 106 as output. The resulting diversified key 106 may correspond to the diversified key 106 of the contactless card 101, which may be used to decrypt the encrypted customer ID 132.

Regardless of the decryption technique used, the authentication application 123 may successfully decrypt the encrypted customer ID 132, thereby verifying the encrypted customer ID 132 (e.g., by comparing the resulting customer ID 107 to a customer ID stored in the account data 124, and/or based on an indication that the decryption using the key 105 and/or 106 was successful). Although the keys 105, 106 are depicted as being stored in the memory 122, the keys 105, 106 may be stored elsewhere, such as in a secure element and/or the HSM 125. In such embodiments, the secure element and/or the HSM 125 may decrypt the encrypted customer ID 132 using the keys 105 and/or 106 and a cryptographic function. Similarly, the secure element and/or HSM 125 may generate the diversified key 106 based on the master key 105 and counter value 104 as described above.

If, however, the authentication application 123 is unable to decrypt the encrypted customer ID 132 to yield the expected result (e.g., the customer ID 107 of the account associated with the contactless card 101), the authentication application 123 does not validate the encrypted customer ID 132. In such an example, the authentication application 123 transmits an indication of the failed verification to the account application 113. As such, the account application 113 may reject performance of the requested operation to preserve the security of the account.

Figure 1B:
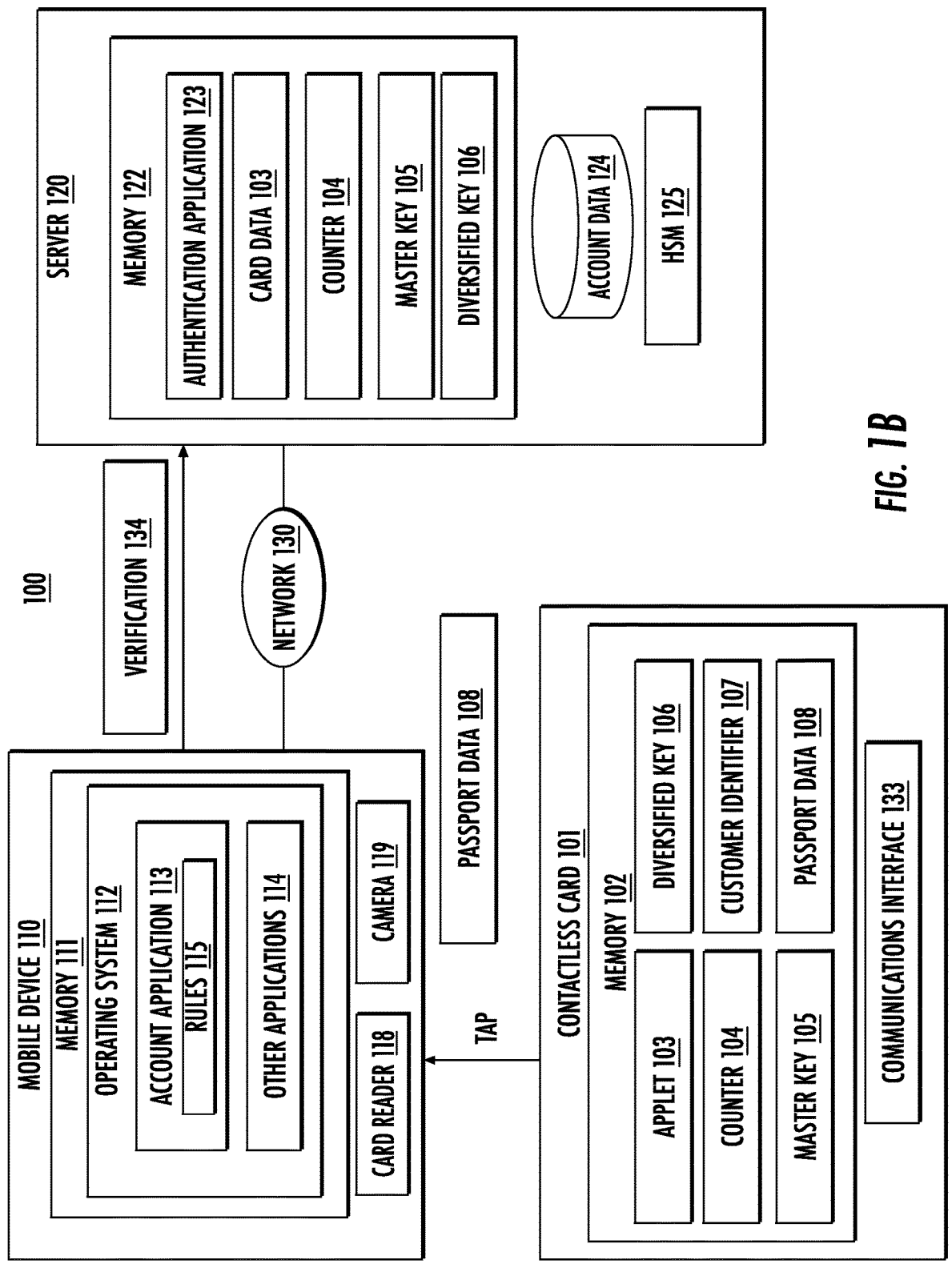

FIG. 1B illustrates an embodiment where the authentication application 123 has decrypted the encrypted customer ID 132, thereby verifying (or authenticating) the encrypted data. As shown, the authentication application 123 transmits a verification 134 to the mobile device 110, where the verification 134 indicates that the authentication application 123 successfully decrypted the encrypted customer ID 132. Responsive to receiving the verification 134, the account application 113 may reference the rules 115 to determine what, if any, additional authentication steps are required. The rules 115 may generally specify a plurality of different authentication rules and/or thresholds for different requested operations. The rules may be based on the type of requested operation. For example, for the transfer of funds, the rules 115 may require additional authentication based on additional data elements such as the passport data 108.

In such an example, the account application 113 may output an indication specifying that the user tap the contactless card 101 to the mobile device 110. The account application 113 may then instruct the contactless card 101 to transmit the passport data 108. In response, the contactless card 101 may transmit the passport data 108 to the account application 113. As stated, in some embodiments, the passport data 108 may be encrypted. The passport data 108 may be encrypted using one or more attributes of the passport, such as a passport number of the user's passport, an issue date of the user's passport, and/or an expiration date of the user's passport. Although depicted as being received in a separate tap of the contactless card 101, in some embodiments, the passport data 108 is transmitted with the encrypted user ID 132 in a single tap of the contactless card 101 to the mobile device 110, e.g., the tap depicted in FIG. 1A.

The account application 113 may then receive the passport attributes for decrypting the encrypted passport data 108. For example, a user may provide the passport number, expiration date, and/or issue date via a graphical user interface (GUI) of the account application 113. In another embodiment, the camera 119 of the mobile device 110 may be used to capture one or more images of one or more pages of a physical version of the passport. The one or more pages may depict the attributes required to decrypt the encrypted passport data 108. Therefore, the account application 113 may extract the passport number, expiration date, and/or issue date from the captured images, e.g., by using computer vision, optical character recognition (OCR), etc.

In the embodiment depicted in FIG. 1B, the account application 113 decrypts the encrypted passport data 108 using the received passport attributes. If the decryption is successful, the account application 113 may permit performance of the requested operation. For example, upon decrypting the passport data 108, the account application 113 may display a GUI allowing the user to initiate the desired transfer of funds. Otherwise, the account application 113 may restrict performance of the requested operation, e.g., by blocking access to the GUI for transfer of funds, outputting a notification that the requested operation cannot be performed based on the failed decryption, etc.

Figure 2A:
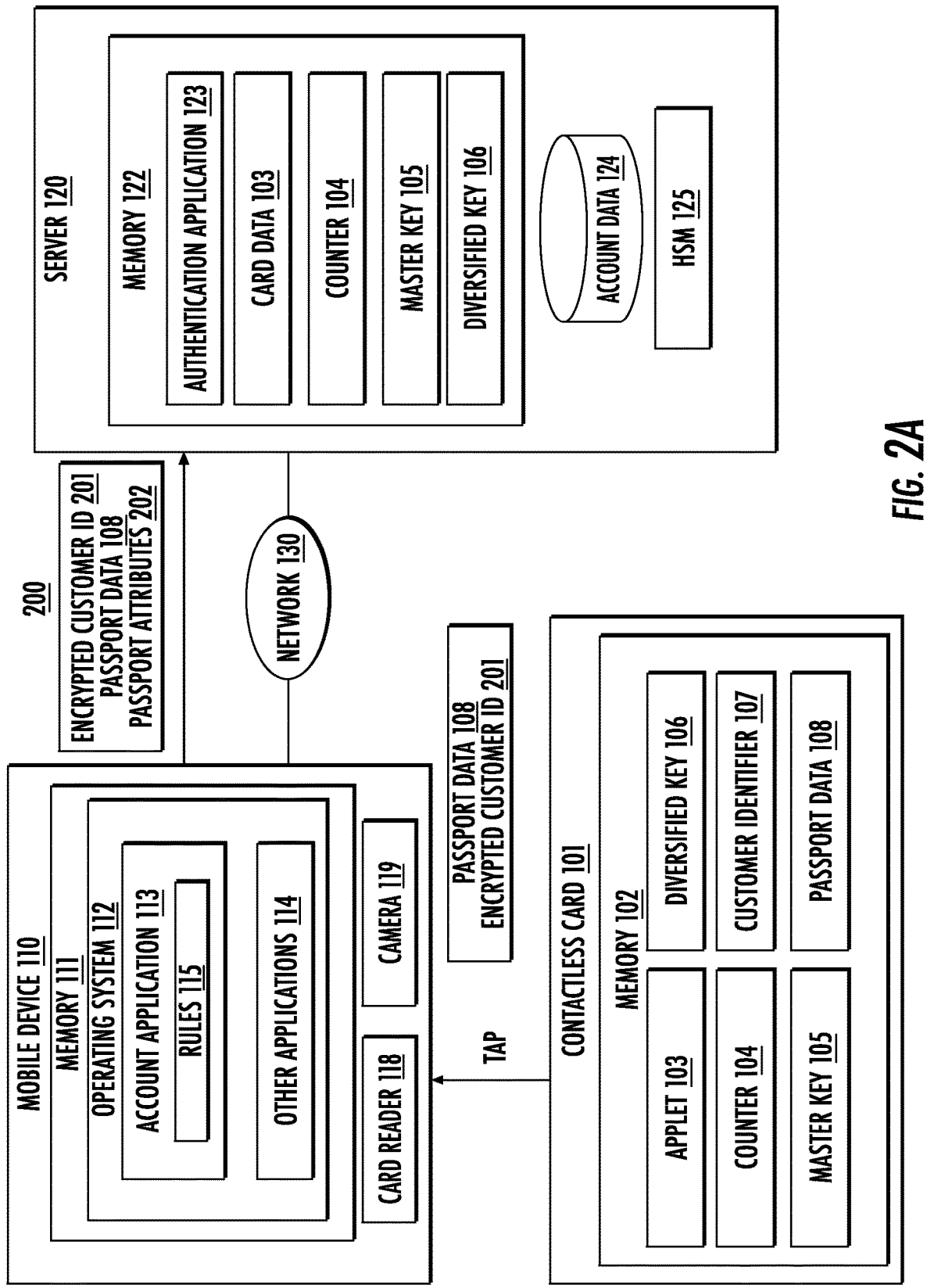
FIGS. 2A-2B illustrate embodiments of a system for secure authentication based on passport data stored in a contactless card.

In some embodiments, the authentication server 120 decrypts the encrypted passport data 108. For example, FIG. 2A is a schematic 200 depicting an embodiment where the authentication server 120 is used to decrypt the passport data 108. As shown, the user taps the contactless card 101 to the mobile device 110 to proceed with a requested operation. As stated, the user may provide authentication credentials to access the account associated with the contactless card 101 prior to tapping the contactless card 101 to the device 110. For example, the requested operation may be to update account information in the account application 113 after providing the authentication credentials to access account details. In response to the tap, the applet 103 generates an encrypted customer ID 201, which is transmitted to the account application 113 with the encrypted passport data 108. Generally, the encrypted customer ID 201 is generated by the applet 103 as described above with respect to the generation of the encrypted customer ID 132 (e.g., by encrypting the customer ID 107 with the master key 105 and/or the diversified key 106).

Responsive to receiving the encrypted customer ID 201 and the encrypted passport data 108, the account application 113 may receive the passport attributes (e.g., the passport number, expiration date, and/or issue date) needed to decrypt the encrypted passport data 108. For example, the user may provide the passport attributes as input in a GUI of the account application 113. As another example, an image of the physical passport may be captured, and the account application 113 may extract the passport attributes from the captured image, e.g., by identifying the relevant fields and values in the image. Once received, the account application 113 may transmit the received passport attributes to the authentication server 120 as the passport attributes 202 with the encrypted customer ID 201 and the passport data 108.

Figure 2B:
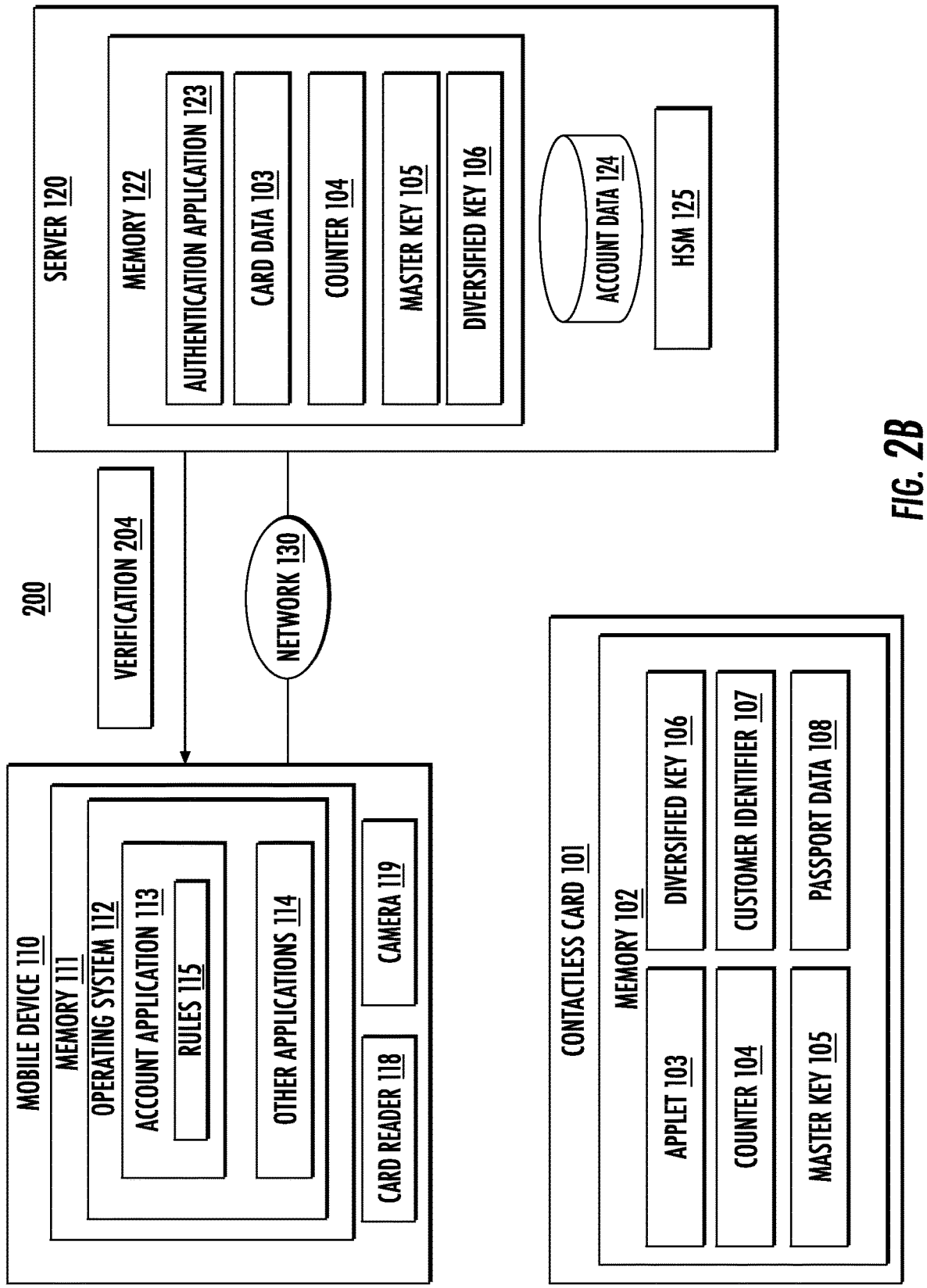

Once received, the authentication application 123 may attempt to decrypt the encrypted customer ID 201 using the master key 105 and/or the diversified key 106 as described above. If the attempted decryption yields the customer ID 107 associated with the account, the authentication application 123 may attempt to decrypt the passport data 108 using the passport attributes 202. If the decryption of the encrypted customer ID 201 and the passport data 108 is successful, as reflected in FIG. 2B, the authentication application 123 may transmit a verification 204 to the account application 113. The account application 113 may then permit the requested operation based on receipt of the verification 204, which specifies that the encrypted customer ID 201 and the encrypted passport data 108 were verified (or authenticated) by the authentication server 120. For example, the account application 113 may expose and/or enable a GUI that allows the user to modify their account details. If either attempted decryption (of the encrypted customer ID 201 and the encrypted passport data 108) is not successful, the authentication application 123 may transmit an indication of the failed decryption(s) to the account application 113, which may reject performance the requested operation. For example, the account application 113 may restrict access to the GUI (and/or disable elements thereof) that allows the user to modify their account details.

In some embodiments, the passport data 108 that has been encrypted using the passport attributes may further be encrypted by the applet 103 based on the master key 104 and/or the diversified key 106. Therefore, in such embodiments, the authentication application 123 may initially decrypt the passport data 108 using the keys 105 and/or 106 as described above. If the initial decryption is successful, the authentication application 123 may attempt to decrypt the passport data 108 using the passport attributes 202. If the decryption of the passport data 108 using the passport attributes 202 is successful, the authentication application 123 may transmit the verification 204 to the account application 113, which may authorize the requested operation.

Regardless of the entity decrypting the passport data 108, in at least one embodiment, the applet 103 of the contactless card 101 may generate a digital signature (not pictured) for the passport data 108 using the keys 105 and/or 106. The digital signature may sign the passport data 108. The contactless card 101 may then transmit the digital signature with the passport data 108 to the account application 113, which in turn transmits the digital signature to the authentication server 120. The authentication application 123 may also verify the digital signature by decrypting the digital signature using a public key associated with the contactless card 101 and stored by the server 120. If the digital signature is verified, the authentication application 123 may transmit an indication of the successful digital signature verification to the account application 113, which may permit performance of the operation based on verification of the digital signature. If the digital signature is not verified, the account application 113 may restrict performance of the operation.

Regardless of the entity decrypting the passport data 108, in some embodiments, the account application 113 may determine a level of access permissions specified by the rules 115 required to perform the operation. For example, the rules 115 may require that the user have a "high" security level to perform the requested operation (e.g., transfer of funds). However, the user's account data 124 (which may be stored locally in the account application 113 and/or received from the server 120) may specify that the user has a "medium" level of security. In such embodiments, the account application 113 may transmit a request for an updated permissions level to the server 120. In response, the authentication application 123 may determine to update the user's permissions level to "high" based on the decryption of the encrypted customer ID 201 and the passport data 108. In such an embodiment, the authentication application 123 may transmit the updated permissions level to the account application 113, which permits the requested operation based on the updated permissions level meeting the permissions level required by the rules 115.

Furthermore, in some embodiments, the user may obtain a new and/or updated passport. In such embodiments, the account application 113 may receive the new and/or updated versions of the passport data 108, e.g., from the authentication server 120. In such embodiments, the account application 113 may transmit the updated passport data received from the server 120 to the contactless card 101, and the applet 103 may store the received data in the memory 102.

FIG. 3A is a schematic 300 depicting an example embodiment of tapping the contactless card 101 to provide secure authentication based on the passport data 108 stored in the contactless card 101. As shown, the account application 113 may receive a request to perform an operation. For example, the request may be to transfer funds from one account to another account. The account application 113 may reference the rules 115 to determine which type of data is required to authorize the requested transfer of funds. For example, the rules 115 may specify that fund transfers require verification of the encrypted customer ID and verification based on the passport data 108. In at least one embodiment, the type of data specified by the rules 115 is based on the type of requested operation (e.g., the transfer of funds). Generally, the rules 115 may specify different levels of security for different types of transaction (e.g., requiring verification of passport data 108 for higher risk operations, while not requiring verification of the passport data 108 for lower risk operations).

In response, the account application 113 may output an indication to tap the contactless card 101 to the device 110. Once the user taps the contactless card 101 to the mobile device 110, the applet 103 of the contactless card 101 encrypts the customer ID 107 (e.g., to produce the encrypted customer IDs 132 and/or 201). The applet 103 may then transmit the encrypted customer ID 107 and the encrypted passport data 108 to the mobile device 110, e.g., via NFC.

As shown in the schematic 310 of FIG. 3B, the account application 113 may output an indication specifying that the user take a photo of one or more pages of their physical passport using the camera 119. The user may then capture an image of the passport. The account application 113 may then process the captured image to extract one or more attributes of the passport, such as the passport number, issue date, and expiration date.

As stated, in some embodiments, the account application 113 may decrypt the encrypted passport data 108 using the attributes extracted from the image. In other embodiments, such as the embodiments of FIGS. 3A-3B, the authentication application 123 may decrypt the encrypted passport data 108 using the attributes extracted by the account application 113. Therefore, the account application 113 may transmit the encrypted customer ID 107, the encrypted passport data 108, and the extracted attributes of the passport to the authentication application 123.

The authentication application 123 may then attempt to decrypt the encrypted customer ID 107 (and/or the encrypted passport data 108) using the master key 105 and/or the diversified key 106 associated with the contactless card 101. If the authentication application 123 is unable to decrypt the encrypted customer ID 107 to yield an expected result (e.g., the customer ID 107 of the account, etc.), the authentication application 123 does not verify the encrypted customer ID 107. If the authentication application 123 successfully decrypts the encrypted customer ID 107 to yield an expected result (e.g., the customer ID 107 of the account, etc.), the authentication application 123 verifies the encrypted customer ID 107 and attempts to decrypt the passport data 108 using the attributes received from the account application 113. If the authentication application 123 successfully decrypts the passport data 108, the account application 123 transmits an indication of the verification of the encrypted customer ID 107 and the encrypted passport data 108 to the account application 113. The account application 113 may then permit performance of the requested operation responsive to receiving the verification.

If, however, the authentication application 123 is unable to decrypt the encrypted customer ID 107 and/or the encrypted passport data 108, the authentication application 123 transmits an indication of the failed decryption(s) to the account application 113. The account application 113 may then restrict performance of the requested operation, e.g., by disabling the "Next" button depicted in FIG. 3B.

As stated, in some embodiments, the rules 115 specify a permissions level required to perform the associated operation. For example, to update the account details, the rules 115 may require a permissions level greater than or equal to 2.0 on a scale from 0.0-10.0. Therefore, in such embodiments, the account application 113 may transmit the user's current permissions level to the authentication application 123. The current permissions level may be stored locally by the account application 113 (e.g. in an instance of the account data 124 stored in the memory 111 of the mobile device 110) and/or received from the authentication application 123 (e.g., when the user logs into the account application 113 using authentication credentials).

In such examples, the user's current permissions level may be 1.5. Therefore, the account application 113 may transmit an indication to the authentication application 123 specifying that the user's current permissions level does not meet the required permissions level. The authentication application 123 may then determine whether to increase the user's permissions level. For example, based on the authentication application 123 successfully decrypting the encrypted customer ID 107 and the encrypted passport data 108, the authentication application 123 may increase the user's permissions level to 3.0. The authentication application 123 may transmit an indication of the new permissions level to the account application 113 with the verification. The account application 113 may then permit the performance of the requested operation responsive to receiving the verification from the authentication server 123 and based on the updated permissions level exceeding the permissions level specified in the rules 115.

Figure 4A:
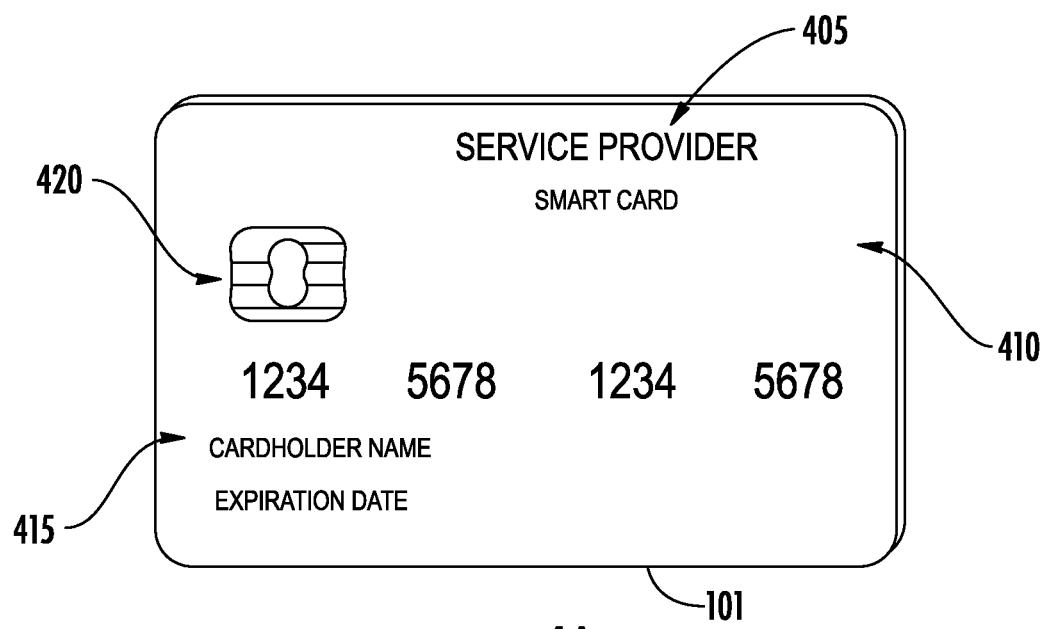
FIGS. 4A-4B illustrate an example contactless card.

FIG. 4A illustrates a contactless card 101, which may comprise a payment card, such as a credit card, debit card, and/or a gift card. As shown, the contactless card 101 may be issued by a service provider 405 displayed on the front or back of the card 101. In some examples, the contactless card 101 is not related to a payment card, and may comprise, without limitation, an identification card. In some examples, the payment card may comprise a dual interface contactless payment card. The contactless card 101 may comprise a substrate 410, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101 may have physical characteristics compliant with the ID-1 format of the ISO/IEC 7810 standard, and the contactless card may otherwise be compliant with the ISO/IEC 14443 standard. However, it is understood that the contactless card 101 according to the present disclosure may have different characteristics, and the present disclosure does not require a contactless card to be implemented in a payment card.

The contactless card 101 may also include identification information 415 displayed on the front and/or back of the card, and a contact pad 420. The contact pad 420 may be configured to establish contact with another communication device, such as the mobile devices 40, a user device, smart phone, laptop, desktop, or tablet computer. The contactless card 101 may also include processing circuitry, antenna and other components not shown in FIG. 4A. These components may be located behind the contact pad 420 or elsewhere on the substrate 410. The contactless card 101 may also include a magnetic strip or tape, which may be located on the back of the card (not shown in FIG. 4A).

Figure 4B:
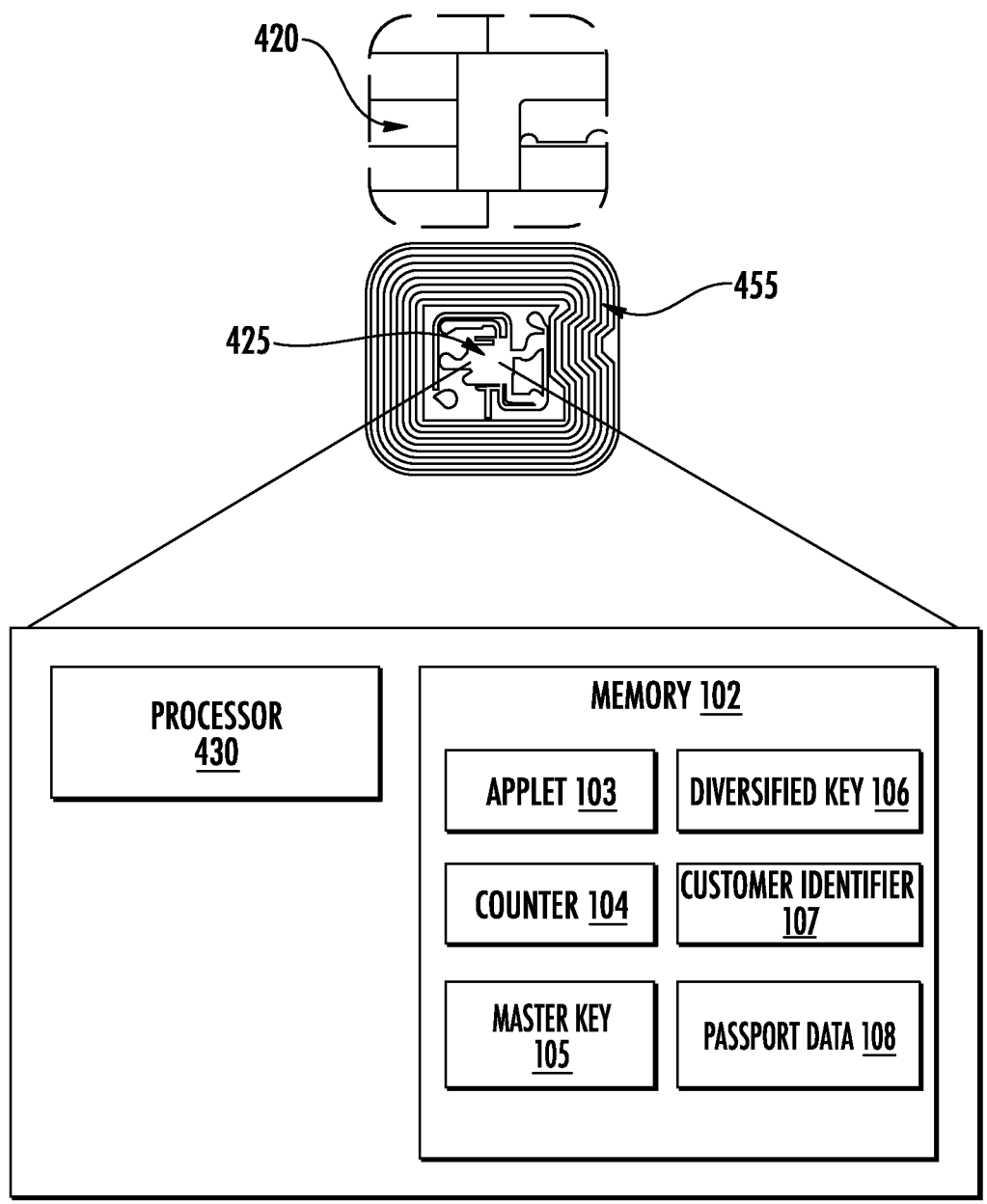

As illustrated in FIG. 4B, the contact pad 420 of contactless card 101 may include processing circuitry 425 for storing and processing information, including a microprocessor 430 and the memory 102. It is understood that the processing circuitry 425 may contain additional components, including processors, memories, error and parity/CRC checkers, data encoders, anti-collision algorithms, controllers, command decoders, security primitives and tamper proofing hardware, as necessary to perform the functions described herein.

The memory 102 may be a read-only memory, write-once read-multiple memory or read/write memory, e.g., RAM, ROM, and EEPROM, and the contactless card 101 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. A read/write memory may also be read many times after leaving the factory.

The memory 102 may be configured to store one or more applets 103, the counter 104, master key 105, the diversified key 106, one or more customer (or user) IDs 107, and the passport data 108. The one or more applets 103 may comprise one or more software applications configured to execute on one or more contactless cards, such as a Java® Card applet. However, it is understood that applets 103 are not limited to Java Card applets, and instead may be any software application operable on contactless cards or other devices having limited memory. The customer ID 107 may comprise a unique alphanumeric identifier assigned to a user of the contactless card 101, and the identifier may distinguish the user of the contactless card from other contactless card users. In some examples, the customer ID 107 may identify both a customer and an account assigned to that customer and may further identify the contactless card associated with the customer's account. In some embodiments, the applet 103 may use the customer ID 107 as input to a cryptographic algorithm with the keys 105 and/or 106 to encrypt the customer ID 107. Similarly, the applet 103 may use the passport data 108 (which may be unencrypted and/or encrypted based on one or more attributes of the passport 108) as input to a cryptographic algorithm with the keys 105 and/or 106 to encrypt the passport data 108.

The processor and memory elements of the foregoing exemplary embodiments are described with reference to the contact pad, but the present disclosure is not limited thereto. It is understood that these elements may be implemented outside of the pad 420 or entirely separate from it, or as further elements in addition to processor 430 and memory 102 elements located within the contact pad 420.

In some examples, the contactless card 101 may comprise one or more antennas 455. The one or more antennas 455 may be placed within the contactless card 101 and around the processing circuitry 425 of the contact pad 420. For example, the one or more antennas 455 may be integral with the processing circuitry 425 and the one or more antennas 455 may be used with an external booster coil. As another example, the one or more antennas 455 may be external to the contact pad 420 and the processing circuitry 425.

In an embodiment, the coil of contactless card 101 may act as the secondary of an air core transformer. The terminal may communicate with the contactless card 101 by cutting power or amplitude modulation. The contactless card 101 may infer the data transmitted from the terminal using the gaps in the contactless card's power connection, which may be functionally maintained through one or more capacitors. The contactless card 101 may communicate back by switching a load on the contactless card's coil or load modulation. Load modulation may be detected in the terminal's coil through interference. More generally, using the antennas 455, processing circuitry 425, and/or the memory 102, the contactless card 101 provides a communications interface to communicate via NFC, Bluetooth, and/or Wi-Fi communications.

As explained above, contactless cards 101 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader, such as a mobile NFC reader (e.g., the communications interface 118 of the device 110), and produce an NDEF message that comprises a cryptographically secure OTP encoded as an NDEF text tag.

Operations for the disclosed embodiments may be further described with reference to the following figures. Some of the figures may include a logic flow. Although such figures presented herein may include a particular logic flow, it can be appreciated that the logic flow merely provides an example of how the general functionality as described herein can be implemented. Further, a given logic flow does not necessarily have to be executed in the order presented unless otherwise indicated. In addition, the given logic flow may be implemented by a hardware element, a software element executed by a processor, or any combination thereof. The embodiments are not limited in this context.

Figure 5:
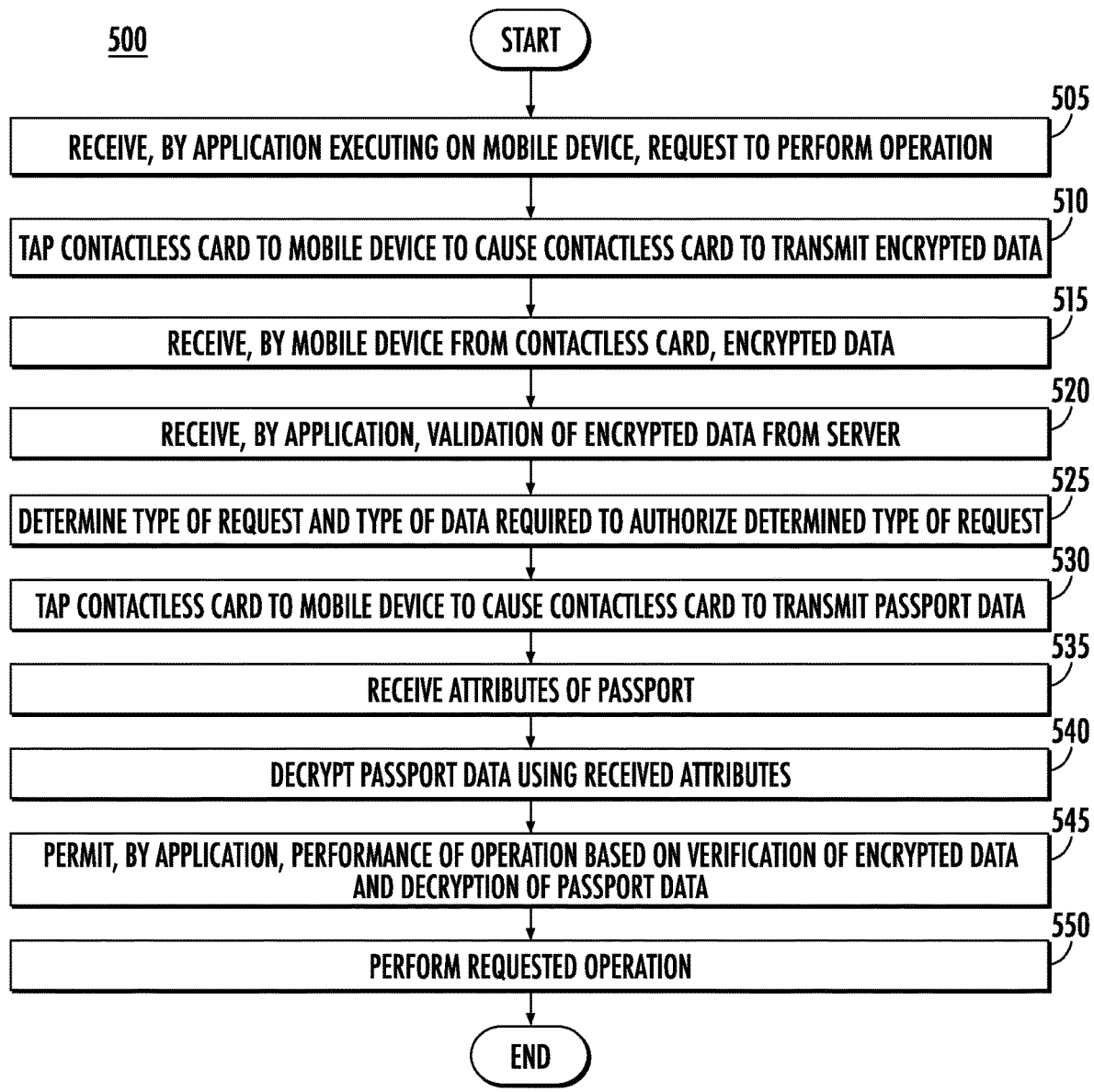
FIG. 5 illustrates an embodiment of a first logic flow.

FIG. 5 illustrates an embodiment of a logic flow 500. The logic flow 500 may be representative of some or all of the operations executed by one or more embodiments described herein. For example, the logic flow 500 may include some or all of the operations to use the contactless card 101 to provide secure authentication based on passport data stored in the contactless card 101. Embodiments are not limited in this context.

As shown, the logic flow 500 begins at block 505, where the account application 113 receives a request to perform an operation. As stated, the requested operation may be received based on input from a user of the account application 113, an external source (e.g., one of the other applications 114), or any other source. The request may be related to, for example and without limitation, use of the account application 113, use of the other applications 114, operations related to the account associated with the contactless card 101, and/or a transaction. More generally, the request may be received subsequent to a user providing authentication credentials required to access the account in the account application 113. At block 510, a user taps the contactless card 101 to the mobile device 110 to cause the applet 103 of the contactless card 101 to encrypt the customer ID 107 and transmit the encrypted customer ID to the mobile device 110.

At block 515, the account application 113 may receive the encrypted customer ID from the contactless card 101. The account application 113 may then transmit the encrypted customer ID received from the contactless card 101 to the authentication server 120. The server 120 may attempt to decrypt the encrypted customer ID as described herein. At block 520, the account application 113 receives an indication from the server 120 that the encrypted customer ID was verified by decrypting the encrypted customer ID 132.

At block 525, the account application 113 determines a type of the request, which may be used to determine a type of verification data specified in the rules 115 required to authorize the type of operation. For example, the passport data 108 may be specified as the verification data required by the rules 115. At block 530, the user taps the contactless card 101 to the mobile device 110. Doing so instructs the applet 103 of the contactless card 101 to transmit the passport data 108 to the mobile device 110. The account application 113 may then receive the passport data 108 from the contactless card 101. However, as stated, in some embodiments, the passport data 108 may be received at block 515 responsive to the tap at block 510.

At block 535, the account application 113 may receive the passport attributes. For example, a user may provide the passport attributes as input to the account application 113. As another example, the account application 113 may instruct the user to capture an image of the passport page including the passport attributes. The account application 113 may then extract the attributes from the captured image, e.g., by identifying values associated with each passport attribute in the captured image. At block 540, the account application 113 may successfully decrypt the passport data 108 using the attributes received at block 535. As stated, however, in some embodiments, the account application 113 transmits the passport data 108 and the extracted attributes to the authentication application 123 for decryption. In such embodiments, the account application 113 may transmit the passport data 108 and extracted attributes with an encrypted customer ID generated by the contactless card 101. The authentication application 123 may then attempt to decrypt the customer ID and the passport data 108 and inform the account application 113 whether the decryption attempts were successful or unsuccessful.

At block 545, the account application 113 permits performance of the requested operation based on the verification of the encrypted customer ID by the server 120 and the decryption of the encrypted passport data 108. At block 550, the requested operation may be performed, e.g., by the user and/or by the account application 113.

Figure 6:
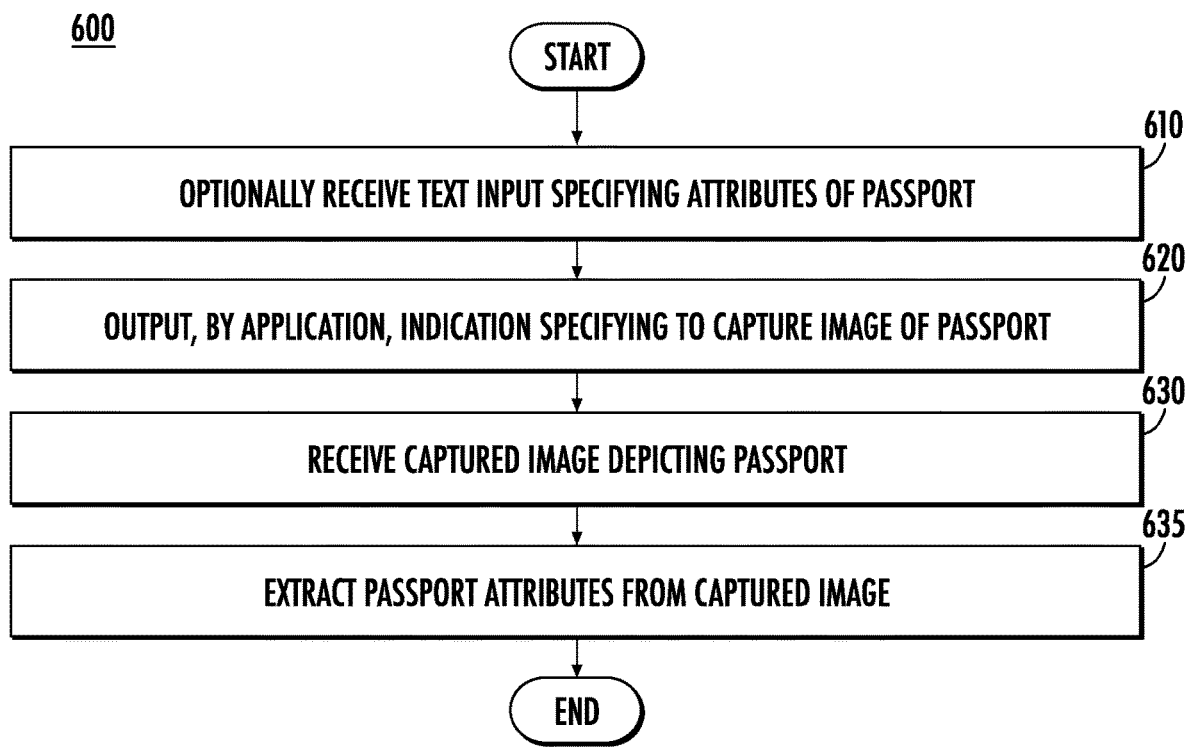
FIG. 6 illustrates an embodiment of a second logic flow.

FIG. 6 illustrates an embodiment of a logic flow 600. The logic flow 600 may be representative of some or all of the operations executed by one or more embodiments described herein. For example, the logic flow 600 may include some or all of the operations to receive passport attributes to decrypt the passport data 108 stored in the contactless card 101. Embodiments are not limited in this context.

As shown, the logic flow 600 begins at block 610, where the account application 113 optionally receives text-based input from a user specifying the passport attributes. As stated, the passport attributes may include the passport number, passport issue date, and passport expiration date. However, other data may be used for encryption/decryption of the passport data 108, such as the person's name or other information. More generally, the account application 113 may be aware of the required attributes and/or attribute types. At block 620, the account application 113 outputs an instruction to the user to capture an image depicting a page of the physical passport corresponding to the passport data 108. At block 630, the account application 113 receives the image captured by the camera 119 of the mobile device 110.

At block 640, the account application 113 extracts the attributes from the captured image. For example, the account application 113 may apply one or more image processing algorithms to extract the attributes. Generally, by being programmed to identify the required passport attributes, the account application 113 may process the image to identify the required attributes and extract the values associated with each attribute. For example, by recognizing text in the image, the account application 113 may identify the "Passport Number" or some variant thereof in the text of the image. The account application 113 may then extract the value (e.g., numeric and/or alphanumeric values) associated with the identified phrase. For example, the account application 113 may be programmed with information describing the layout of the passport. Therefore, the account application 113 may determine where in the image to extract the relevant attribute names, and where in the image to extract the relevant values.

Figure 7:
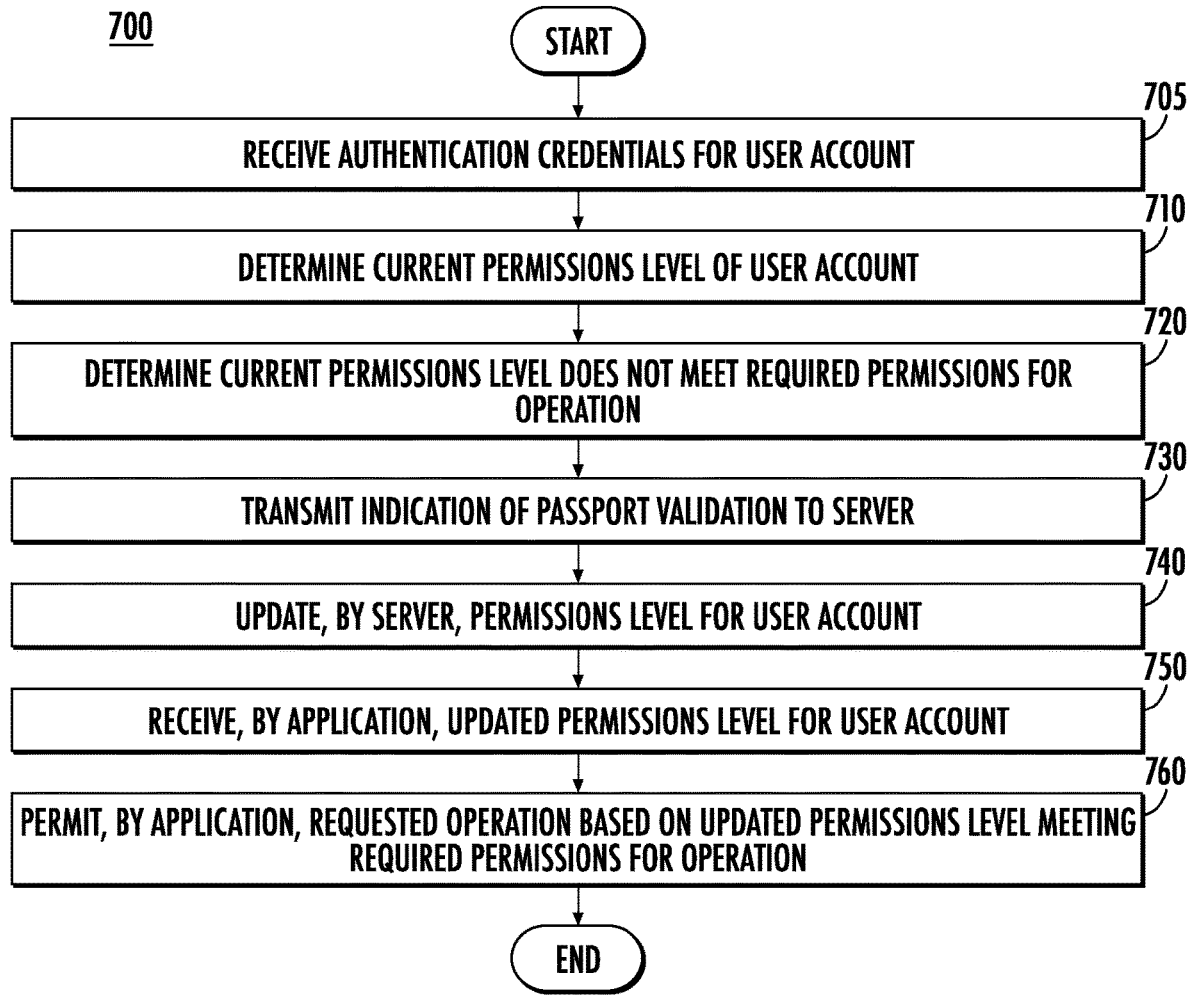
FIG. 7 illustrates an embodiment of a third logic flow.

FIG. 7 illustrates an embodiment of a logic flow 700. The logic flow 700 may be representative of some or all of the operations executed by one or more embodiments described herein. For example, the logic flow 700 may include some or all of the operations to authorize requested operations using the passport data 108 stored in the contactless card 101. Embodiments are not limited in this context.

As shown, the logic flow 700 begins at block 705, where the account application 113 receives authentication credentials associated with an account. At block 710, the account application 113 determines a current permissions level of the account (and/or the user associated with the account). At block 720, the account application 113 determines that the rules 115 specify a permissions level that exceed the current permissions level of the user. The permissions level specified by the rules 115 may be for an operation requested to be performed by the user (e.g., the operation requested at block 505 of the logic flow 500).

At block 730, the account application 113 transmits an indication to the authentication application 123 specifying that the account application 113 has decrypted the passport data 108 (e.g., at block 540 of the logic flow 500). At block 740, the authentication application 123 updates the permissions level of the user. The authentication application 123 may update the permissions level based on the indication specifying that the passport data 108 was decrypted and determining that the authentication application 123 verified encrypted data generated by the contactless card 101. For example, the authentication application 123 may set a timer responsive to validating the encrypted customer ID 107 at block 520 of the logic flow 500. If the authentication application 123 receives the indication at block 730 before the timer exceeds a time threshold, the authentication application 123 may determine to update the permissions level and transmit the updated permissions level to the account application 113.

At block 750, the account application 113 receives the updated permissions level from the server 120. At block 760, the account application 113 determines that the updated permissions level received at block 750 meets or exceeds the permissions level specified for the operation by the rules 115. In response, the account application 113 may permit performance of the operation.

Figure 8:
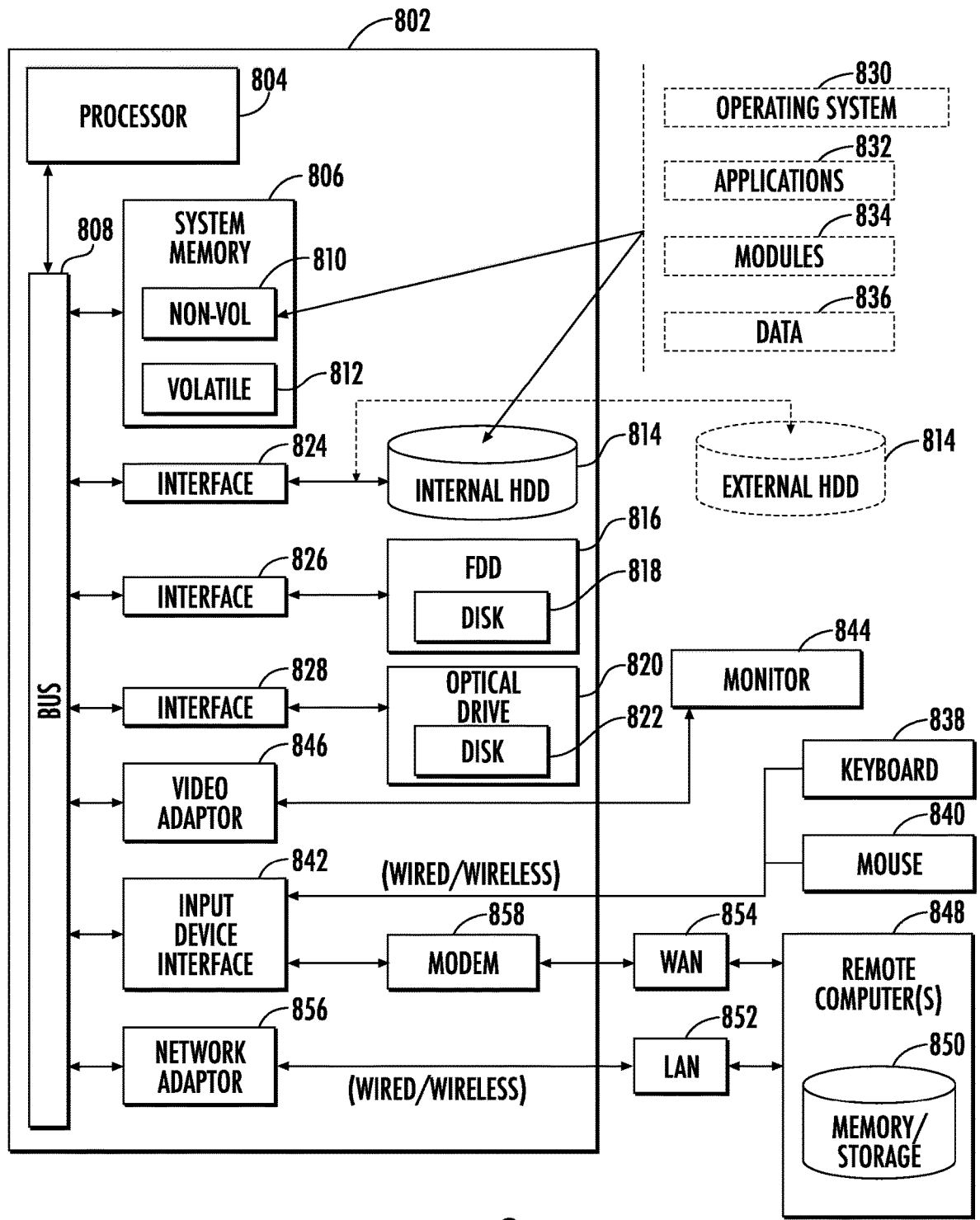
FIG. 8 illustrates an embodiment of a computing system.

FIG. 8 illustrates an embodiment of an exemplary computing architecture 800 comprising a computing system 802 that may be suitable for implementing various embodiments as previously described. In various embodiments, the computing architecture 800 may comprise or be implemented as part of an electronic device. In some embodiments, the computing architecture 800 may be representative, for example, of a system that implements one or more components of the system 100. In some embodiments, computing system 802 may be representative, for example, of the contactless card 101, mobile devices 110, and authentication server 120 of the system 100. The embodiments are not limited in this context. More generally, the computing architecture 800 is configured to implement all logic, applications, systems, methods, apparatuses, and functionality described herein with reference to FIGS. 1-7.

As used in this application, the terms "system" and "component" and "module" are intended to refer to a computer-related entity, either hardware, a combination of hardware and software, software, or software in execution, examples of which are provided by the exemplary computing architecture 800. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing system 802 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing system 802.

As shown in FIG. 8, the computing system 802 comprises a processor 804, a system memory 806 and a system bus 808. The processor 804 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multi processor architectures may also be employed as the processor 804.

The system bus 808 provides an interface for system components including, but not limited to, the system memory 806 to the processor 804. The system bus 808 can be any of several types of bus structure that may further interconnect to a memory bus (with or without a memory controller), a peripheral bus, and a local bus using any of a variety of commercially available bus architectures. Interface adapters may connect to the system bus 808 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 806 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 8, the system memory 806 can include non-volatile memory 810 and/or volatile memory 812. A basic input/output system (BIOS) can be stored in the non-volatile memory 810.

The computing system 802 may include various types of computer-readable storage media in the form of one or more lower speed memory units, including an internal (or external) hard disk drive (HDD) 814, a magnetic floppy disk drive (FDD) 816 to read from or write to a removable magnetic disk 818, and an optical disk drive 820 to read from or write to a removable optical disk 822 (e.g., a CD-ROM or DVD). The HDD 814, FDD 816 and optical disk drive 820 can be connected to the system bus 808 by a HDD interface 824, an FDD interface 826 and an optical drive interface 828, respectively. The HDD interface 824 for external drive implementations can include at least one or both of Universal Serial Bus (USB) and IEEE 1394 interface technologies. The computing system 802 is generally is configured to implement all logic, systems, methods, apparatuses, and functionality described herein with reference to FIGS. 1-7.

The drives and associated computer-readable media provide volatile and/or nonvolatile storage of data, data structures, computer-readable instructions, computer-executable instructions, and so forth. For example, a number of program modules can be stored in the drives and memory units 810, 812, including an operating system 830, one or more application programs 832, other program modules 834, and program data 836. In one embodiment, the one or more application programs 832, other program modules 834, and program data 836 can include, for example, the various applications and/or components of the system 100, e.g., the applet 103, counter 104, master key 105, diversified key 106, customer ID 107, passport data 108, encrypted customer ID 132, operating system 112, account application 113, other applications 114, the authentication application 123, the account data 124, the encrypted customer ID 201, and/or the passport attributes 202.

A user can enter commands and information into the computing system 802 through one or more wire/wireless input devices, for example, a keyboard 838 and a pointing device, such as a mouse 840. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 804 through an input device interface 842 that is coupled to the system bus 808, but can be connected by other interfaces such as a parallel port, IEEE 1394 serial port, a game port, a USB port, an IR interface, and so forth.

A monitor 844 or other type of display device is also connected to the system bus 808 via an interface, such as a video adaptor 846. The monitor 844 may be internal or external to the computing system 802. In addition to the monitor 844, a computer typically includes other peripheral output devices, such as speakers, printers, and so forth.

The computing system 802 may operate in a networked environment using logical connections via wire and/or wireless communications to one or more remote computers, such as a remote computer 848. The remote computer 848 can be a workstation, a server computer, a router, a personal computer, portable computer, microprocessor-based entertainment appliance, a peer device or other common network node, and typically includes many or all of the elements described relative to the computing system 802, although, for purposes of brevity, only a memory/storage device 850 is illustrated. The logical connections depicted include wire/wireless connectivity to a local area network (LAN) 852 and/or larger networks, for example, a wide area network (WAN) 854. Such LAN and WAN networking environments are commonplace in offices and companies, and facilitate enterprise-wide computer networks, such as intranets, all of which may connect to a global communications network, for example, the Internet. In embodiments, the network 130 of FIG. 1 is one or more of the LAN 852 and the WAN 854.

When used in a LAN networking environment, the computing system 802 is connected to the LAN 852 through a wire and/or wireless communication network interface or adaptor 856. The adaptor 856 can facilitate wire and/or wireless communications to the LAN 852, which may also include a wireless access point disposed thereon for communicating with the wireless functionality of the adaptor 856.

When used in a WAN networking environment, the computing system 802 can include a modem 858, or is connected to a communications server on the WAN 854, or has other means for establishing communications over the WAN 854, such as by way of the Internet. The modem 858, which can be internal or external and a wire and/or wireless device, connects to the system bus 808 via the input device interface 842. In a networked environment, program modules depicted relative to the computing system 802, or portions thereof, can be stored in the remote memory/storage device 850. It will be appreciated that the network connections shown are exemplary and other means of establishing a communications link between the computers can be used.

The computing system 802 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method, comprising:
   receiving, by an application executing on a processor of a device, a request to perform an operation associated with an account using a first function of a plurality of functions of the application;
   receiving, by the application, encrypted data from a contactless card associated with the account;
   receiving, by the application from an authentication server, a first permissions level for the account and an indication specifying that the authentication server verified the encrypted data;
   determining, by the application, that the first permissions level for the account does not meet a required permissions level to perform the operation using the first function of the application;
   determining, by the application based on the first permissions level not meeting the required permissions level and a first rule of a plurality of rules, that authentication using encrypted passport data is required to initiate performance of the operation using the first function of the application;
   receiving, by the application, encrypted passport data and a digital signature for the encrypted passport data from the contactless card, the encrypted passport data for a passport associated with the account;
   decrypting, by the application, the encrypted passport data;
   validating, by the application, the digital signature of the encrypted passport data based on a public key;
   transmitting, by the application to the authentication server based on the decryption of the encrypted passport data and the validation of the digital signature, an indication of the first permissions level for the account, an indication reflecting the validation of the digital signature, and an indication specifying that the encrypted passport data was decrypted;
   receiving, by the application from the authentication server, a second permissions level assigned to the account based on the decryption of the encrypted passport data, the second permissions level having greater permissions than the first permissions level; and
   initiating, by the first function of the application, performance of the operation based on the received indication specifying that the authentication server verified the encrypted data, the decryption of the encrypted passport data, the second permissions level of the account, and the determination that the digital signature is valid.

2. The method of claim 1, wherein the encrypted data is based on a diversified key and a customer identifier associated with the contactless card, wherein the diversified key is based on a counter value and a master key associated with the contactless card, wherein the server verifies the encrypted data based on the diversified key, the counter value, and the master key.

3. The method of claim 1, further comprising:
   receiving, by the application, an updated version of the encrypted passport data; and
   transmitting, by the application to the contactless card, the updated version of the encrypted passport data for storage in the contactless card.

4. The method of claim 1, further comprising:
   extracting, by the application, at least one attribute of the passport from a first image of the passport, wherein the first image depicts the at least one attribute of the passport, wherein the application decrypts the encrypted data based on the extracted at least one attribute.

5. The method of claim 1, wherein the operation comprises one or more of: (i) viewing attributes of the account using the first function provided by a first page of a plurality of pages of the application, (ii) modifying the attributes of the account using a second function of the plurality of functions provided by a second page of the plurality of pages of the application, (iii) accessing a third function of the plurality of functions provided by a third page of the plurality of pages of the application, or (iv) processing a transaction using the contactless card using a fourth function of the plurality of functions provided by a fourth page of the plurality of pages of the application.

6. The method of claim 1, wherein the required permissions level is specified by a second rule of the plurality of rules.

7. The method of claim 1, wherein validating the digital signature comprises decrypting the digital signature based on the public key.

8. A non-transitory computer-readable storage medium, the computer-readable storage medium including instructions that when executed by a processor, cause the processor to:
receive, by an application, a request to perform an operation associated with an account using a first function of a plurality of functions of the application;
receive, by the application, encrypted data from a contactless card associated with the account;
receive, by the application from an authentication server, a first permissions level for the account and an indication specifying that the authentication server verified the encrypted data;
determine, by the application, that the first permissions level for the account does not meet a required permissions level to perform the operation using the first function of the application;
determine, by the application based on the first permissions level not meeting the required permissions level and a first rule of a plurality of rules, that authentication using encrypted passport data is required to initiate performance of the operation using the first function of the application;
receive, by the application, encrypted passport data and a digital signature for the encrypted passport data from the contactless card, the encrypted passport data for a passport associated with the account;
decrypt, by the application, the encrypted passport data;
validate, by the application, the digital signature of the encrypted passport data based on a public key;
transmit, by the application to the authentication server based on the decryption of the encrypted passport data and the validation of the digital signature, an indication of the first permissions level for the account, an indication reflecting the validation of the digital signature, and an indication specifying that the encrypted passport data was decrypted;
receive, by the application from the authentication server, a second permissions level assigned to the account based on the decryption of the encrypted passport data, the second permissions level having greater permissions than the first permissions level; and
initiate, by the first function of the application, performance of the operation based on the received indication specifying that the authentication server verified the encrypted data, the decryption of the encrypted passport data, the second permissions level of the account, and the determination that the digital signature is valid.

9. The computer-readable storage medium of claim 8, wherein the encrypted data is based on a diversified key and a customer identifier associated with the contactless card, wherein the diversified key is based on a counter value and a master key associated with the contactless card, wherein the server verifies the encrypted data based on the diversified key, the counter value, and the master key.

10. The computer-readable storage medium of claim 8, wherein the instructions further cause the processor to:
receive, by the application, an updated version of the encrypted passport data; and
transmit, by the application to the contactless card, the updated version of the encrypted passport data for storage in the contactless card.

11. The computer-readable storage medium of claim 8, wherein the instructions further cause the processor to:
extract, by the application, at least one attribute of the passport from a first image of the passport, wherein the first image depicts the at least one attribute of the passport, wherein the application decrypts the encrypted data based on the extracted at least one attribute.

12. The computer-readable storage medium of claim 8, wherein the operation comprises one or more of: (i) viewing attributes of the account using the first function provided by a first page of a plurality of pages of the application, (ii) modifying the attributes of the account using a second function of the plurality of functions provided by a second page of the plurality of pages of the application, (iii) accessing a third function of the plurality of functions provided by a third page of the plurality of pages of the application, or (iv) processing a transaction using the contactless card using a fourth function of the plurality of functions provided by a fourth page of the plurality of pages of the application.

13. The computer-readable storage medium of claim 8, wherein the required permissions level is specified by a second rule of the plurality of rules.

14. The computer-readable storage medium of claim 8, wherein validating the digital signature comprises decrypting the digital signature based on the public key.

15. A computing apparatus comprising:
a processor; and
a memory storing instructions that, when executed by the processor, cause the processor to:
receive, by an application, a request to perform an operation associated with an account using a first function of a plurality of functions of the application;
receive, by the application, encrypted data from a contactless card associated with the account;
receive, by the application from an authentication server, a first permissions level for the account and an indication specifying that the authentication server verified the encrypted data;
determine, by the application, that the first permissions level for the account does not meet a required permissions level to perform the operation using the first function of the application;
determine, by the application based on the first permissions level not meeting the required permissions level and a first rule of a plurality of rules, that authentication using encrypted passport data is required to initiate performance of the operation using the first function of the application;
receive, by the application, encrypted passport data and a digital signature for the encrypted passport data from the contactless card, the encrypted passport data for a passport associated with the account;
decrypt, by the application, the encrypted passport data;
validate, by the application, the digital signature of the encrypted passport data based on a public key;
transmit, by the application to the authentication server based on the decryption of the encrypted passport data and the validation of the digital signature, an indication of the first permissions level for the account, an indication reflecting the validation of the digital signature, and an indication specifying that the encrypted passport data was decrypted;

receive, by the application from the authentication server, a second permissions level assigned to the account based on the decryption of the encrypted passport data, the second permissions level having greater permissions than the first permissions level; and initiate, by the first function of the application, performance of the operation based on the received indication specifying that the authentication server verified the encrypted data, the decryption of the encrypted passport data, the second permissions level of the account, and the determination that the digital signature is valid.

16. The computing apparatus of claim 15, wherein the encrypted data is based on a diversified key and a customer identifier associated with the contactless card, wherein the diversified key is based on a counter value and a master key associated with the contactless card, wherein the server verifies the encrypted data based on the diversified key, the counter value, and the master key.

17. The computing apparatus of claim 15, wherein the instructions further cause the processor to:

receive, by the application, an updated version of the encrypted passport data; and transmit, by the application to the contactless card, the updated version of the encrypted passport data for storage in the contactless card.

18. The computing apparatus of claim 15, wherein the instructions further cause the processor to:

extract, by the application, at least one attribute of the passport from a first image of the passport, wherein the first image depicts the at least one attribute of the passport, wherein the application decrypts the encrypted data based on the extracted at least one attribute.

19. The computing apparatus of claim 15, wherein the operation comprises one or more of: (i) viewing attributes of the account using the first function provided by a first page of a plurality of pages of the application, (ii) modifying the attributes of the account using a second function of the plurality of functions provided by a second page of the plurality of pages of the application, (iii) accessing a third function of the plurality of functions provided by a third page of the plurality of pages of the application, or (iv) processing a transaction using the contactless card using a fourth function of the plurality of functions provided by a fourth page of the plurality of pages of the application.

20. The computing apparatus of claim 15, wherein the required permissions level is specified by a second rule of the plurality of rules, wherein validating the digital signature comprises decrypting the digital signature based on the public key.

\* \* \* \* \*